United States Patent
Benuzzi (10) Patent No.: US 6,571,674 B2
(45) Date of Patent: Jun. 3, 2003

(54) DEVICE FOR MAKING A SERIES OF CUTS AT DIFFERENT ANGLES IN ONE OR MORE PANELS

(75) Inventor: Piergiorgio Benuzzi, Bologna (IT)

(73) Assignee: Giben Impianti S.p.A., Bologna (IT)

( * ) Notice: Subject to any disclaimer, the term of this patent is extended or adjusted under 35 U.S.C. 154(b) by 23 days.

(21) Appl. No.: 09/752,362

(22) Filed: Dec. 29, 2000

(65) Prior Publication Data

US 2001/0025554 A1 Oct. 4, 2001

(30) Foreign Application Priority Data

Mar. 30, 2000 (IT) ........................................ BO00A0176

(51) Int. Cl.[7] .............................. B26D 7/06; B23Q 5/22
(52) U.S. Cl. ............................... 83/733; 83/36; 414/19; 414/754; 414/781
(58) Field of Search ...................... 83/36, 404.2, 705, 83/733, 468.3; 414/781, 783, 754, 19

(56) References Cited

U.S. PATENT DOCUMENTS

| | | | | |
|---|---|---|---|---|
| 24,314 A | * | 6/1859 | Lemman | 83/733 |
| 48,349 A | * | 6/1865 | Wright et al. | 83/733 |
| 76,250 A | * | 3/1868 | Roche | 83/705 |
| 298,737 A | * | 5/1884 | Eral | 83/705 |
| 1,250,977 A | * | 12/1917 | Cottrell | 83/733 |
| 2,519,269 A | * | 8/1950 | McCrink | 83/767 |
| 2,557,357 A | * | 6/1951 | Maddox | 414/754 |
| 2,648,381 A | * | 8/1953 | Engel | 83/36 |
| 3,466,514 A | * | 9/1969 | Brunner et al. | 318/577 |
| 3,764,126 A | * | 10/1973 | Arenas | 83/733 |
| 3,946,633 A | * | 3/1976 | Campbell | 83/36 |
| 3,982,627 A | * | 9/1976 | Isohata | 414/81 |
| 4,022,314 A | * | 5/1977 | Crnell | 83/705 |
| 4,270,426 A | * | 6/1981 | Raphael | 83/733 |
| 4,850,257 A | * | 7/1989 | Mohr | 83/404.2 |
| 4,887,904 A | * | 12/1989 | Nakazato et al. | 414/754 |
| 5,148,730 A | * | 9/1992 | McCaw | 83/522.18 |
| 5,257,900 A | | 11/1993 | Benuzzi | |
| 5,311,799 A | * | 5/1994 | Mohr | 83/36 |
| 5,850,774 A | * | 12/1998 | Naldi | 83/404.2 |
| 5,904,084 A | * | 5/1999 | Weston | 83/733 |
| 6,152,680 A | * | 11/2000 | Howells et al. | 414/781 |
| 6,164,176 A | * | 12/2000 | Larsson | 83/435.12 |
| 6,209,938 B1 | * | 4/2001 | James, Jr. | 414/783 |
| 6,220,132 B1 | * | 4/2001 | Faircloth | 83/36 |
| 6,334,380 B1 | * | 1/2002 | Huang | 83/468.3 |
| 6,470,780 B1 | * | 10/2002 | Benuzzi | 83/733 |

* cited by examiner

Primary Examiner—Allan N. Shoap
Assistant Examiner—Jason Prone
(74) Attorney, Agent, or Firm—Fay, Sharpe, Fagan, Minnich & McKee, LLP (57) ABSTRACT

The invention relates to a method and device for making a series of cuts at different angles in one or more panels using a panel sawing machine. The method comprises the steps of: placing a stack of panels on a worktable; turning the stack a first time in a first direction of rotation; making a first series of cuts in the stack; turning the stack a second time in a direction opposite to the first direction of rotation and in such a way as to move the stack closer to the cutting line; and making a second series of cuts in the stack. The device comprises: a worktable having a cutting line for a panel sawing machine; a pickup element that moves along a first guide perpendicular to the cutting line; and a pusher element that moves along a second guide parallel to the cutting line.

13 Claims, 8 Drawing Sheets

DEVICE FOR MAKING A SERIES OF CUTS AT DIFFERENT ANGLES IN ONE OR MORE PANELS

BACKGROUND OF THE INVENTION

The present invention relates to a method and device for making a series of cuts at different angles in one or more panels using a panel sawing machine.

As is known, panel sawing machines are used to cut large panels, slabs or sheets (or stacks of these), made mainly of wood base materials but also of plastic or composite materials, in order to make smaller panels.

Machines of this kind usually comprise a worktable on which one or more panels, placed over one another to form a substantially rectangular stack, are positioned, and a handling device that feeds the panel stack to one or more cutting stations positioned at different angles. In some cases, however, the panels have to be cut several times and only if they are rotated about the cutting line, cut a first time a then rotated and cut again.

In known methods and machines that normally carry out these operations, a portion of the panel worktable, normally the central portion of the worktable, is made to rotate. Alternatively, the entire stack is turned by mechanical arms which are mounted along the sides of the worktable. These mechanical arms grip the panel stack by one edge and turn it by sliding it on the surface of the worktable which may be made of low friction material or which, more usually, consists of a set of supporting elements which enable the panel to be moved along the two Cartesian axes defining the main plane in which the panel stack lies.

These methods have considerable disadvantages due mainly to the slowness and cost of the machinery required.

In a more advanced solution disclosed by the Applicant (see U.S. Pat. No. 5,257,900), a portion of the panel stack close to the corner opposite the cutting line is held by a gripper mounted on the panel stack handling device. At the same time, a push roller acts against the side of the stack adjacent to the cutting line (see FIG. 2 of the drawings accompanying this U.S. patent). The panels are then rotated a first time through 90 degrees by moving the gripper towards the cutting line in a direction perpendicular to the cutting line while the push roller is driven towards the gripper's path in a direction parallel to the cutting line. Next, the gripper is disengaged from the panel stack and the handling device-crossbeam is moved in the opposite direction back to the end of the stack opposite the cutting line. The same device is then used to push the panels towards the cutting line so that the first series of cuts can be made.

Once this step has been completed, the gripper once again engages a portion of the panel stack close to the corner opposite the cutting line while the push roller acts against the side of the stack adjacent to the direction of movement of the gripper (see FIG. 3 of the drawings accompanying this U.S. patent). The second rotation of the panels is carried out in the same direction as the first by moving the gripper towards the cutting line in a direction perpendicular to the latter and moving the push roller away from the gripper's path in a direction parallel to the cutting line. As in the step described above, the gripper is disengaged from the panel stack and the handling device is moved in the opposite direction back to the end of the panel stack opposite the cutting line. The device is then used to push the panel stack towards the cutting line so that the second series of cuts can be made.

This method and the apparatus that implements it have considerable disadvantages.

First of all, the second rotation, unlike the first, moves the center of gravity of the panels away from the cutting line. The handling device must therefore push the stack along an additional path before it can be cut. Owing to the large size of the panels, this means lengthening the process considerably.

Another disadvantage is linked to the machine architecture, that is to say, the use of a gripper mounted on the panel handling device. After each of the two rotations, the device must return to the starting position before the panel stack can be pushed towards the cutting line. This further slows down the cutting process.

SUMMARY OF THE INVENTION

The aim of the present invention is to overcome the drawbacks of the prior art described above.

The invention has for a specific object to provide a method and device capable of optimizing the time required to make a series of cuts at different angles in one or more panels using a panel saw.

The above aim and object are achieved by a method and a device, as described in the claims, for making a series of cuts at different angles in one or more panels using a panel saw.

BRIEF DESCRIPTION OF THE DRAWINGS

The method and device according to the present invention will now be described with reference to the accompanying drawings which illustrate a preferred embodiment without limiting the scope of the invention and in which.

DESCRIPTION OF THE PREFERRED EMBODIMENTS

Figure 1:
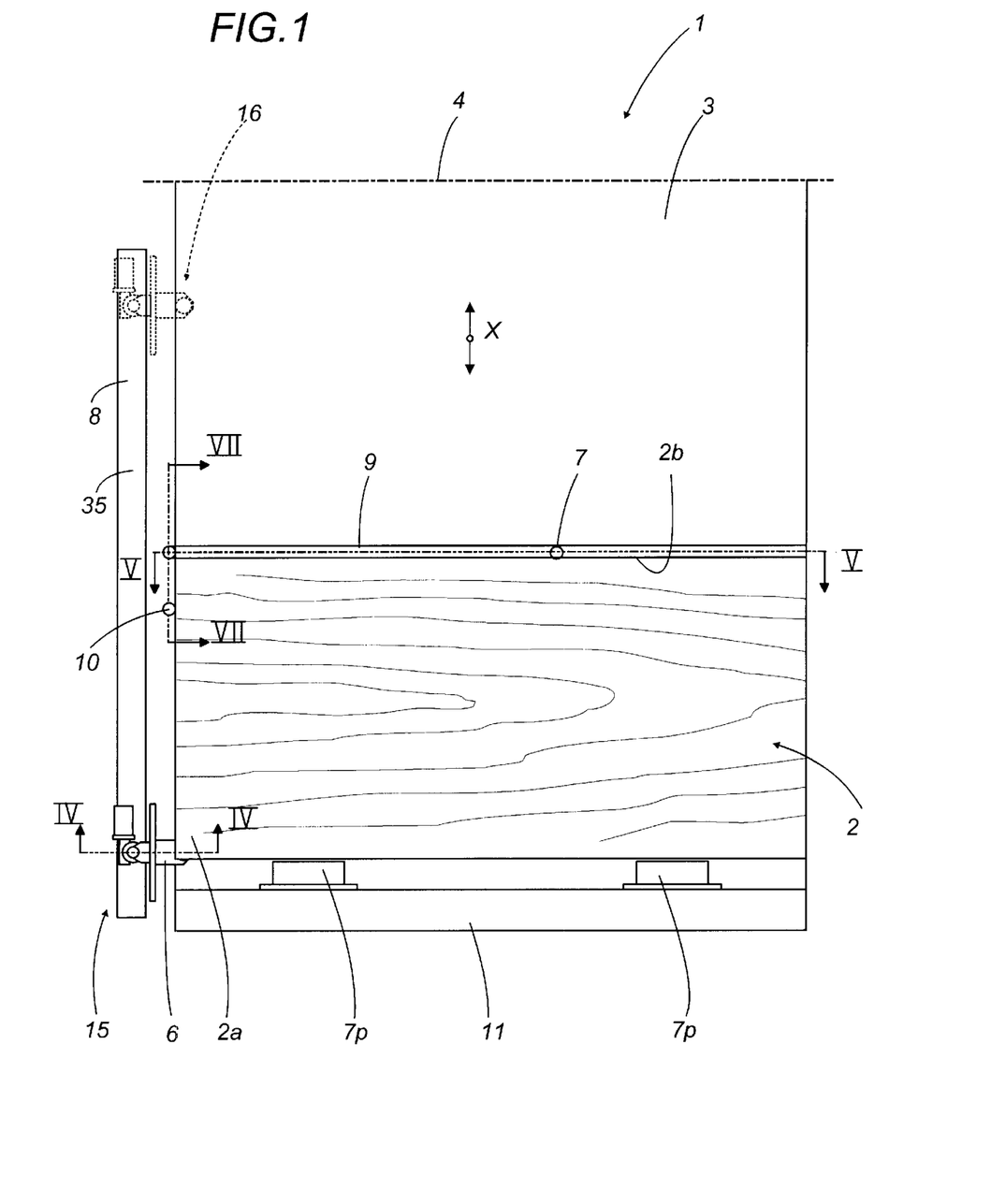
FIG. 1 is a plan view of the device according to the invention.

With reference to FIG. 1, the numeral 1 indicates as a whole the device made according to the present invention.

The device 1 comprises a worktable 3 that has a cutting line 4 for a panel sawing machine that is not illustrated in the drawings since it is of a type well known to experts in the trade and fully illustrated in the document cited above as prior art.

The worktable 3 is designed to receive a stack 2 of one or more panels having a substantially rectangular shape. The numeral 11 indicates a device designed to pick up the panel stack and to move to and fro along direction X. In practice, this device consists of a crossbeam that mounts a plurality of pickup or gripping elements, illustrated schematically as 7p, which grip the front edge of the panel stack and move it towards and away from the cutting line 4.

Figure 4:
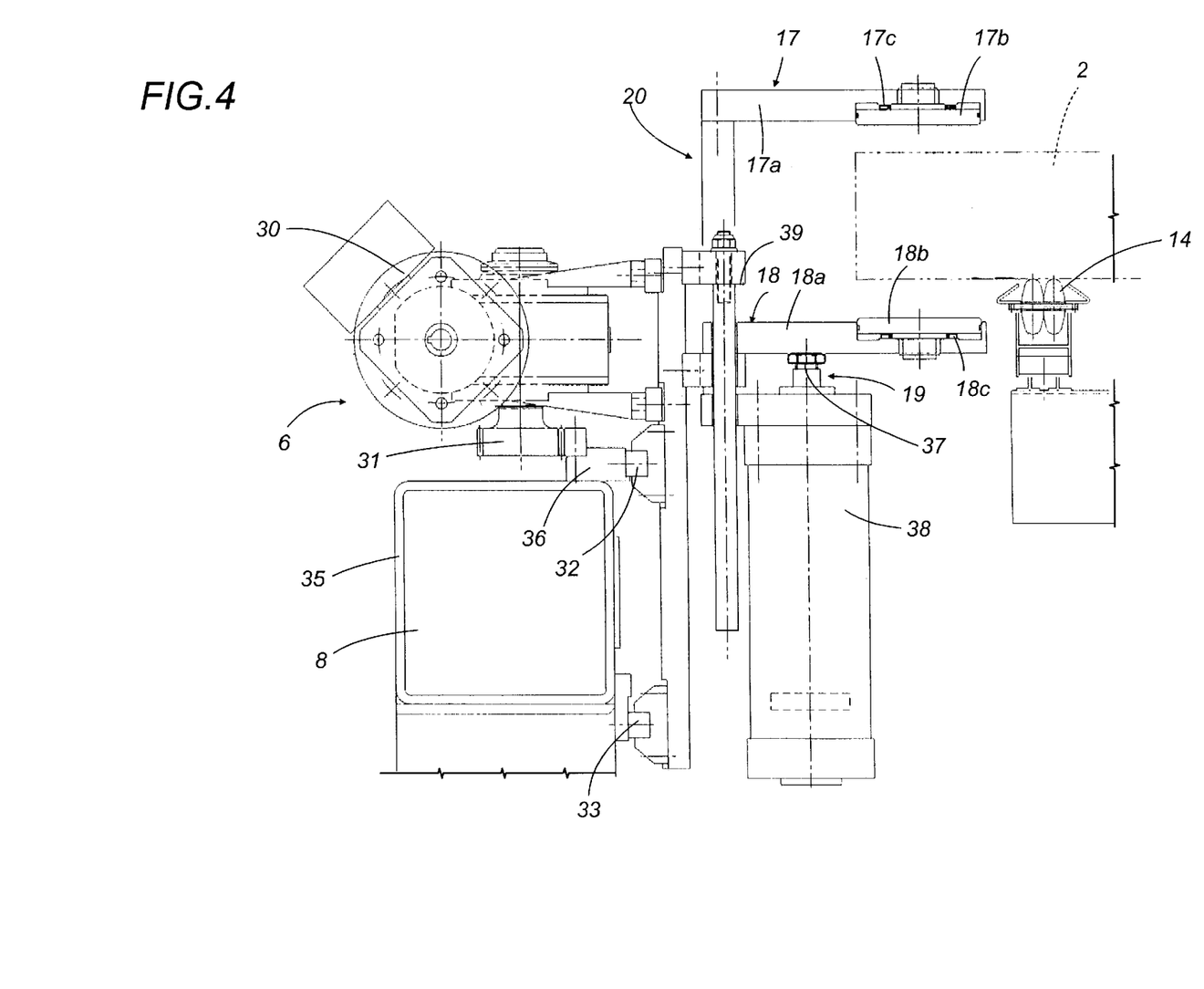
FIG. 4 is a longitudinal section of the pickup element through line IV—IV in FIG. 1.
Figure 5:
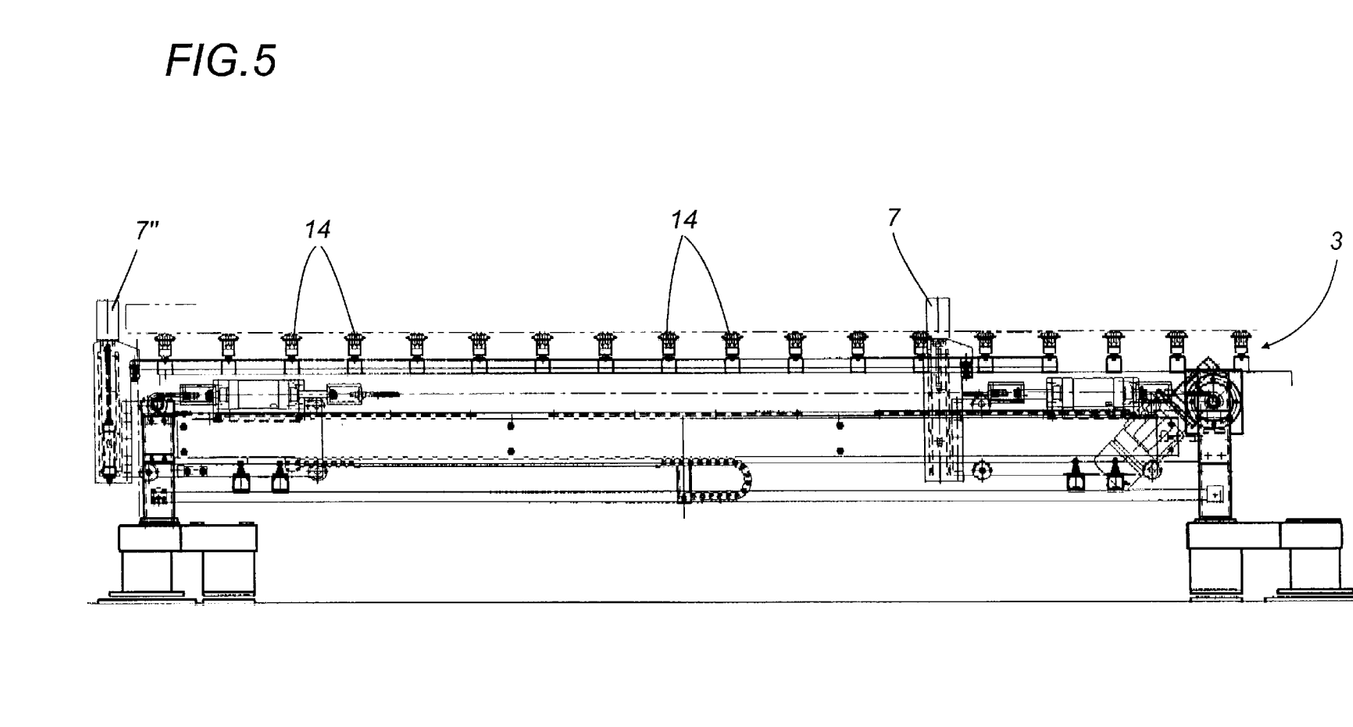
FIG. 5 is a longitudinal section of the worktable through line V—V in FIG. 1.

Along the top of the worktable 3 there is a plurality of wheels 14, illustrated in FIGS. 4 and 5, which constitute the elements that support the weight of the panel stack and which are designed to limit the friction created by the sliding of the stack 2 on the worktable.

First handling means 15 work in conjunction with the worktable 3 to turn the stack a first time about the cutting line 4 in a first rotation direction 5.

In the embodiment being described, the first handling means 15 comprise a first guide 8 extending crossways on the worktable 3, preferably perpendicularly to the cutting line 4, and a second guide 9 extending on the worktable 3 in a direction substantially perpendicular to the first guide 8.

Looking in more detail, the first guide 8 comprises a mounting beam 35 that supports two straight guides or rails 32, 33 and a rack 36.

The handling means 15 further comprise a pickup element 6 that moves along the first guide 8 and a push element 7 that moves along the second guide 9.

The pickup element 6 comprises a gripper 20, illustrated in FIG. 4, with two jaws 17, 18, each of which has a supporting portion 17*a*, 18*a* and an active portion 17*b*, 18*b* designed to engage the stack 2. The active portions 17*b*, 18*b* are mounted on the supporting portions 17*a*, 18*a* in such a way that they can turn freely, for example on ball bearings 17*c*, 18*c*. A pneumatic system 19 opens and closes the jaws so as to engage and release the stack 2.

The pneumatic system 19 comprises a piston 37 attached to the second jaw 18 and a cylinder attached to the first jaw 17.

The pickup element 6 is mounted on the guide 8 in such a way that it can move along the two rails 32, 33. The movement of the pickup element 6 along the guide 8 is accomplished by a toothed wheel 31 that meshes with the rack 36 and is driven by a motor 30. In FIG. 1, for example, the numeral 16 indicates the forward position, close to the cutting line.

Figure 7:
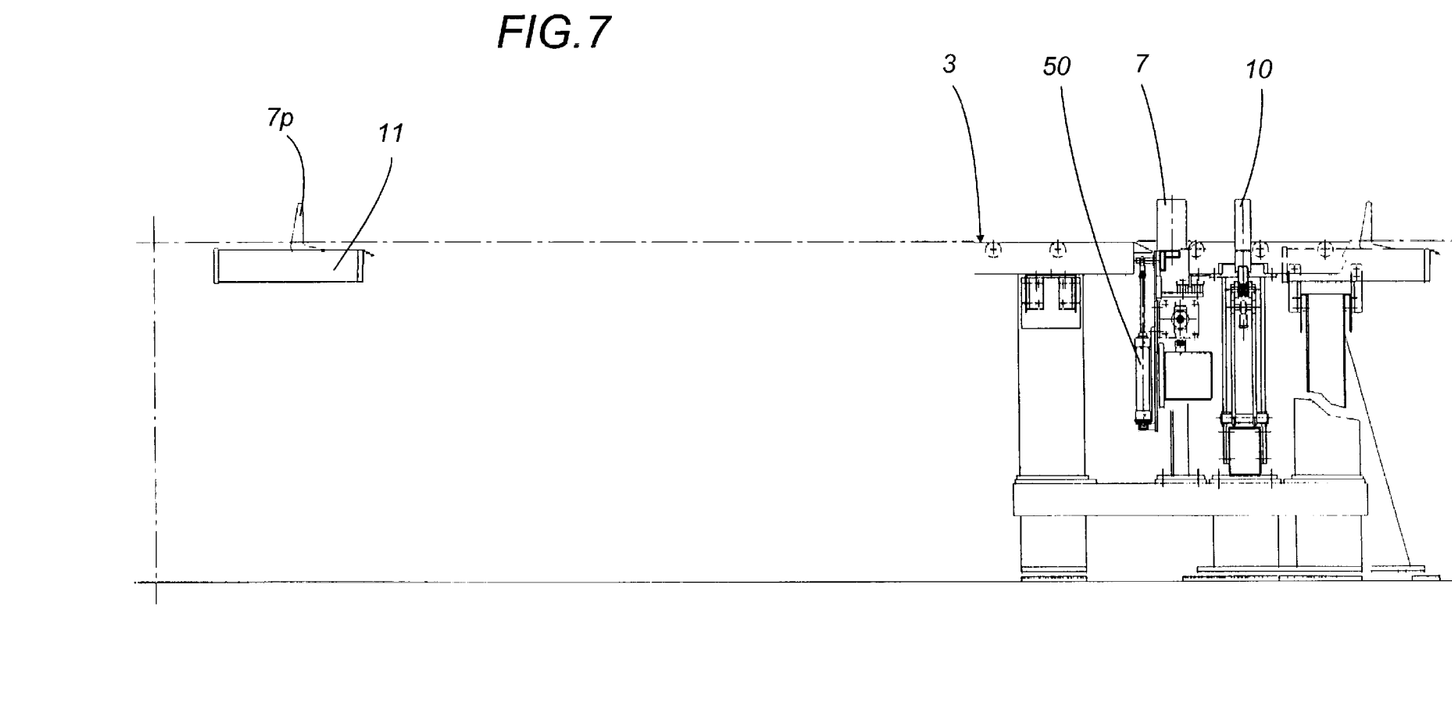
FIG. 7 is a cross section of the worktable through line VII—VII in FIG. 1.

The push element 7 moves from a first, working position on the worktable 3 where it acts on the side of the stack 2 and a second, idle position where it is below the worktable 3. In the second position, the push element 7 can move along the guide 9 so that it passes under the worktable 3. The movement of the push element 7 from the first working position on the worktable to the second idle position is controlled by a cylinder and piston system labeled 50 in FIG. 7.

Figure 6:
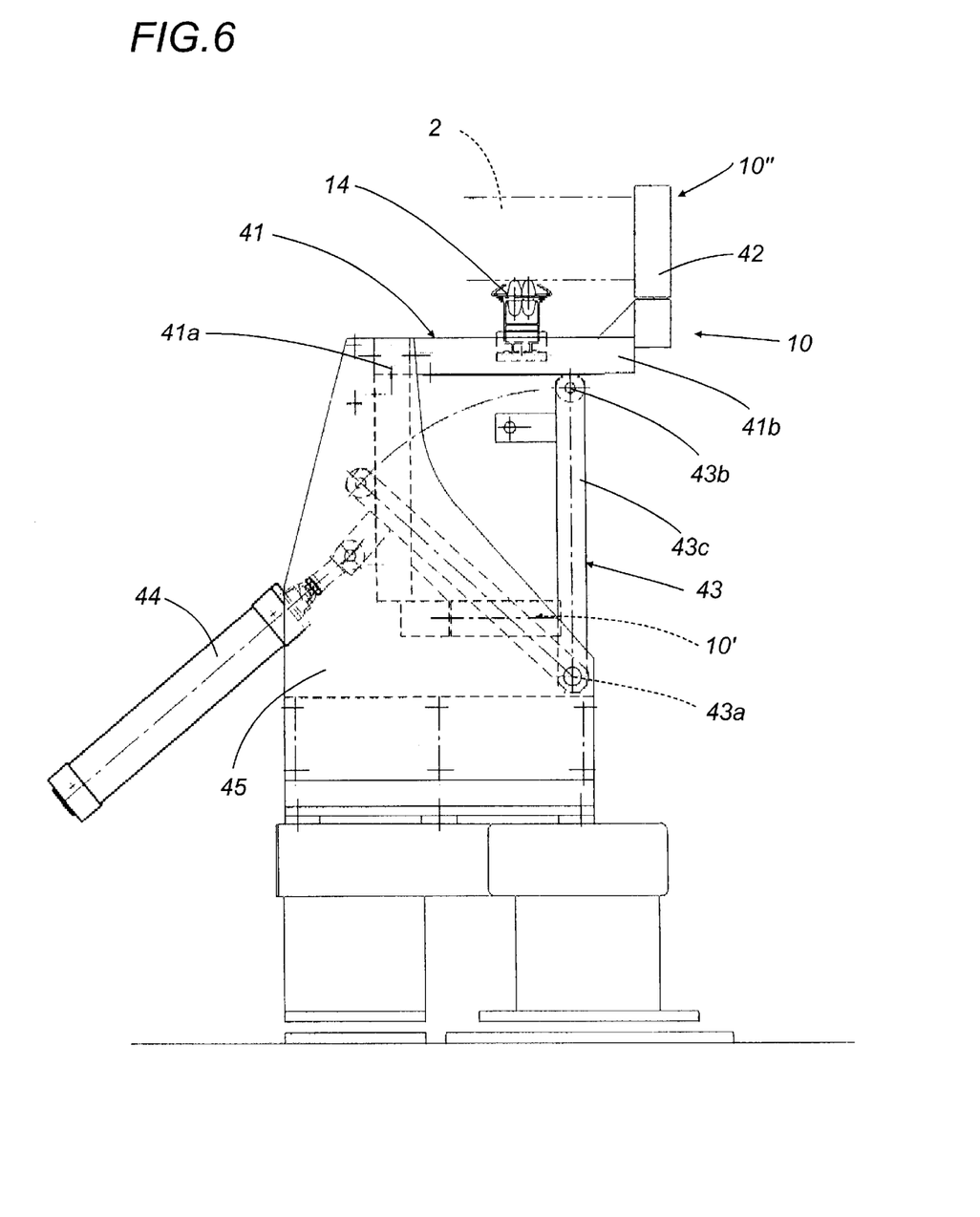
FIG. 6 is a longitudinal section of the fence in two working conditions.

The device 1 further comprises a fence 10, illustrated in detail in FIG. 6 designed to ensure that the panel stack 2 is correctly positioned relative to the cutting line 4. The fence 10 moves from an idle position 10' where it is under the worktable 3 and a working position 10" where it is above the worktable 3.

Looking in more detail, the fence 10 comprises a first arm 41 and a second arm 42 perpendicular to the first arm, as shown in FIG. 6. The first arm 41 is hinged, at a first end 41*a*, to a bed 45 over which the worktable 3 is positioned. The second arm 42 is rigidly connected to the second end 41*b* of the first arm 41.

When the fence 10 is in the working position 10", the first arm 41 is aligned with the worktable 3, while the second arm 42 provides a stop surface against which the panel stack 2 abuts. When the fence moves to the idle position 10', the first arm 41 is rotated by 90 degrees relative to the worktable 3 so that the two arms 41, 42 are positioned below the worktable 3.

A lever 43 and a control piston 44 move the two arms 41, 42 from the working position 10" to the idle position 10' and vice versa. The first end 43*a* of the lever 43 is hinged to the bed 45 and the second end 43*b* abuts against the first arm 41. The control piston 44 acts between the bed 45 and the central portion 43*c* of the lever 43.

Lastly, the device 1 comprises the aforementioned push carriage 11 that pushes the panel stack 2 on the worktable 3 to the cutting line 4 when it has to be cut.

The present invention also relates to a method for making a series of cuts at different angles in one or more panels using a panel sawing machine.

In a preferred embodiment, the method comprises a step of placing a stack 2 of one or more panels on a worktable 3 having a cutting line 4 for a panel sawing machine.

Figure 8:
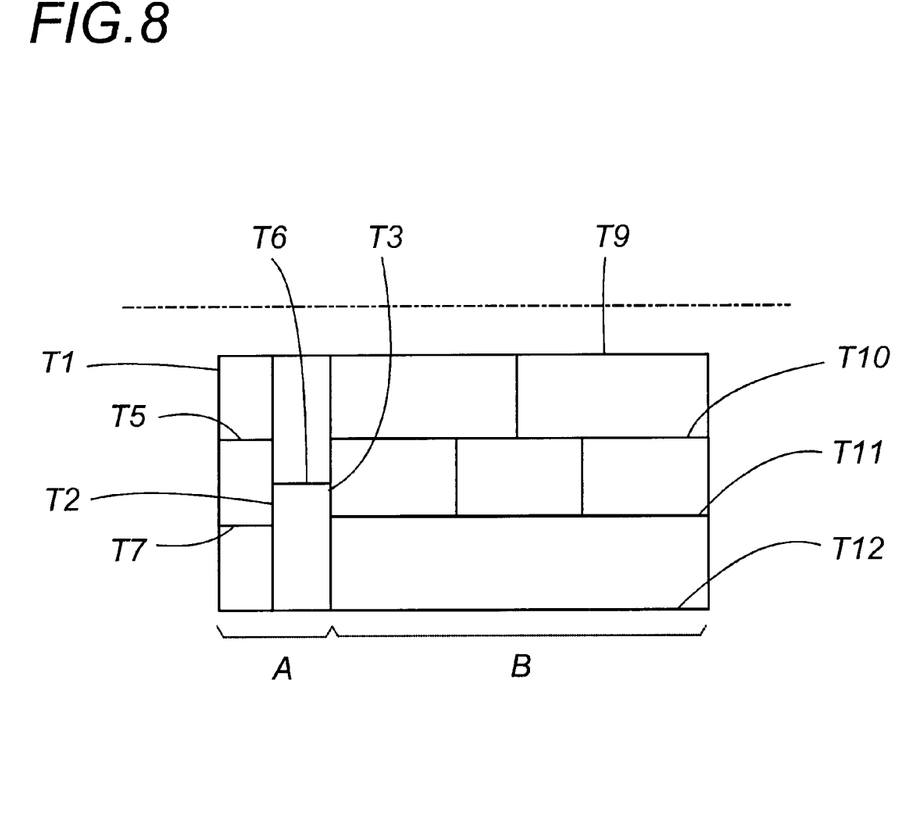
FIG. 8 shows a cutting pattern for a panel stack to be cut.

In particular, the panel stack 2 has to be cut according to a defined cutting pattern, an example of which is illustrated in FIG. 8.

Figure 2:
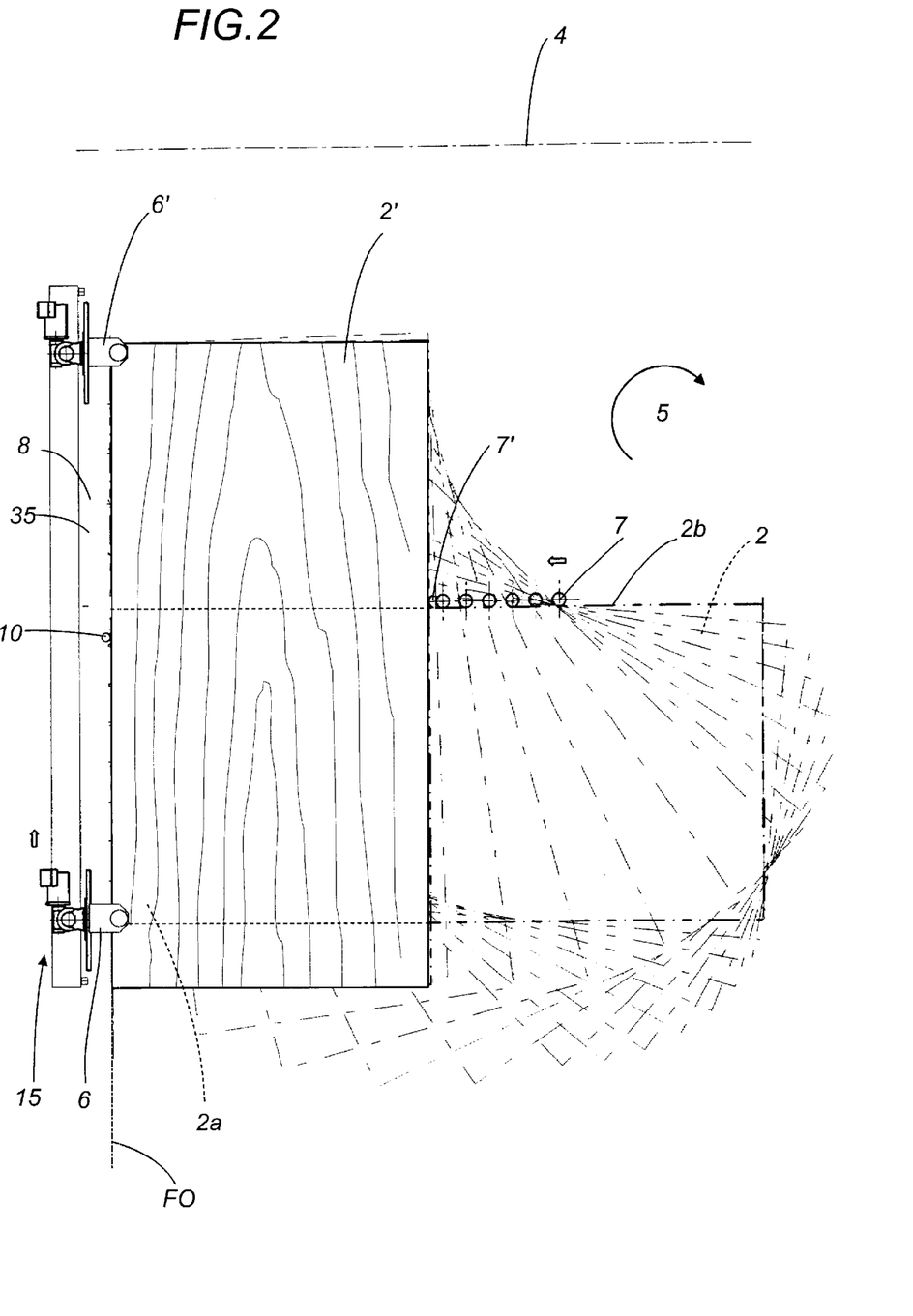
FIG. 2 shows the different positions occupied by the panel stack during the first rotation.

The method according to the invention also comprises a step of turning the panel stack 2 a first time through 90 degrees in a first rotation direction indicated by the arrow 5.

This step is carried out after rotatably securing the pickup element 6 to the panel stack at a corner portion 2*a* opposite the cutting line 4 and after the push element 7 has abutted against the side 2*b* of the panel stack opposite the corner portion 2*a* and located near the cutting line 4.

In particular, the step of rotatably securing the pickup element 6 to the corner portion 2*a* of the panel stack is carried out by activating the pneumatic system 19. In this way, the second jaw 18 of the gripper 20 is pushed by the piston 37 towards the panel stack 2. A stop element 39 stops the jaw 18 at a position where the active portion 18*b* abuts against the underside of the panel stack 2. At this point, since the piston 37 is stopped, the cylinder 38 moves downwards, dragging the first jaw 17, to which it is connected, along with it.

The first jaw 17 is stopped when it abuts against the top surface of the panel stack 2 and the drive pressure of the pneumatic system 19 is counterbalanced by the forces exerted by the jaws 17, 18 on the panel stack 2.

The panel stack 2 is now turned by moving the pickup element 6 towards the cutting line 4. Once the pickup element 6 has moved past the axis of the second guide 9, the fence 10 is activated and moves to the working position 10", while the push element 7 moves along the second guide 9 to reach the working position 10".

During this step, the pickup element 6 advantageously moves along the first guide 8 following a first, straight path, that is transversal, and preferably perpendicular, to the cutting line 4.

The push element 7, on the other hand, moves along the second guide 9 following a second path that is substantially perpendicular to the first path.

At the end of the step just described, the panel stack 2, which was initially positioned with its long sides parallel to the cutting line 4, is now located at the position labeled 2', and the pickup element 6 and the push element 7 are located at the positions labeled respectively 6' and 7' in FIG. 2.

While the panel stack 2 is in this position, the panel saw can make a first series of one or more cuts. In the example cutting pattern shown in FIG. 8, the first series will include the cuts labeled T1, T2 and T3, where T1 is usually a trimming cut.

The step of making the first series of cuts in the panel stack 2 in turn comprises the step of disengaging the pickup element 6 from the panel stack 2, together with the push element 7 and the fence 10, which will move to its idle position 10'.

The panel stack 2 is gripped by the gripping elements 7p, located on the push carriage 11, carried to the cutting line 4 and cut.

The cut portions of the panel stack 2, labeled A in FIG. 8, will then be conveyed to other cutting stations where they can be cut further, for example along lines T5, T6 and T7 in FIG. 8.

Figure 3:
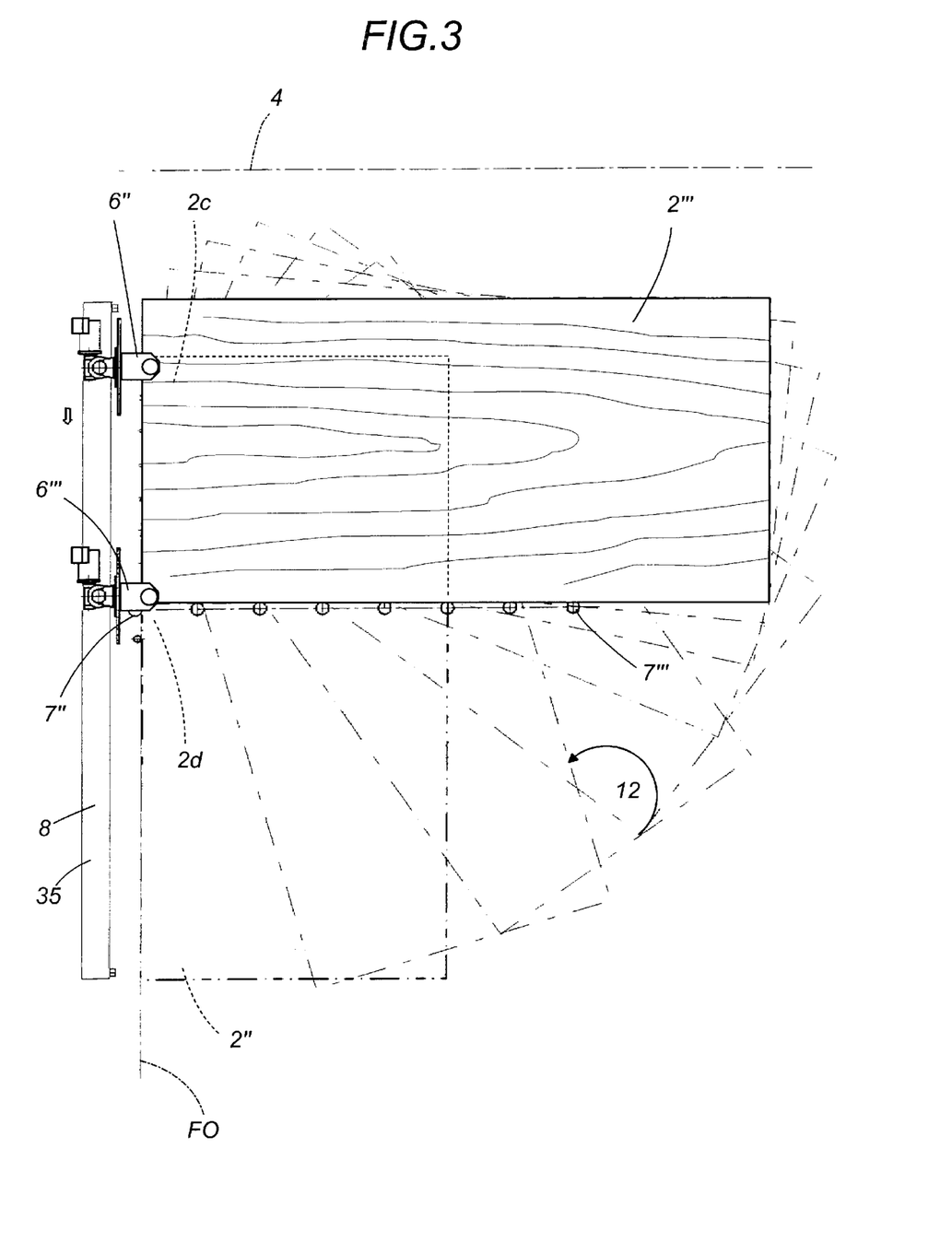
FIG. 3 shows the different positions occupied by the panel stack during the second rotation.

The portion of the panel stack 2 that remains on the worktable 3 can then be turned again, preferably by 90 degrees, as shown in FIG. 3.

The second rotation of the panel stack 2 occurs in a direction, indicated by the arrow 12 in FIG. 3, opposite to the first rotation direction and in such a manner as to move the panel stack 2 closer to the cutting line 4.

In this case, according to the invention, the pickup element 6 rotatably secures the panel stack at a corner portion 2c located close to the cutting line 4 and the push element 7 abuts against a portion 2d of the side of the panel stack located close to the first guide 8. Advantageously, the portion 2d is further away from the cutting line than the corner portion 2c.

The second rotation is carried out by moving the push element 7 away from the first guide 8 along the second guide 9, and then moving the pickup element 6 away from the cutting line 4 along the first guide 8.

As for the first rotation, the pickup element 6 moves along the first, straight path, that is transversal, and preferably perpendicular, to the cutting line 4, while the push element 7 follows the second path that is substantially perpendicular to the first path.

At the end of the step just described, the panel stack 2, which was initially at the position labeled 2" in FIG. 3, is now at the position labeled 2''', the pickup element 6 has moved from position 6" to position 6''', while the push element has moved from position 7" to position 7'''.

At this point, the panel saw can make a second series of one or more cuts in the panel stack 2. In the example cutting pattern shown in FIG. 8, the second series, labeled B, will include the cuts labeled T9, T10, T11 and T12 (where T9 is the usual trimming cut).

The panel stack 2 is carried by the push carriage 11 to the cutting line 4 and cut.

The invention has the following important advantages.

Notice first of all that, in the method taught by the present invention, the step of turning the panel stack the second time enables the panel stack to be moved closer to the cutting line. Compared to solutions taught by prior art, this aspect of the present invention reduces the distance that has to be traveled by the panel stack to reach the cutting line, with evident advantages in terms of reduction of working time.

Another advantage is linked to the fact that the devices used to rotate the panel stack are not the same devices that move the panel stack towards and away from the cutting line. Rotation is carried out by the pickup element and the push element, while the other movements are carried out by the push carriage 11. This means that, unlike solutions taught by prior art, the push carriage 11 is ready at its working position and does not have to move when the panel stack stops turning. The absence of this movement further reduces working time.

Yet another advantage is that, thanks to the machine architecture with the pickup element 6 mobile along the guide 8, which is situated outside the worktable 3, the panel stack remains on a fixed reference line (labeled F0 in FIGS. 2 and 3) whatever position it is in after being turned (as indicated by the reference numerals 2', 2", and 2'''). This permits improved extraction of sawdust by the machine's upper dust extractor, which is not illustrated since it is of a type well known to experts in the trade.

What is claimed:

1. A device for making a series of cuts at different angles in one or more panels using a panel sawing machine that comprises:

a worktable for supporting an associated stack of one or more panels, said worktable having at least one cutting line for a panel sawing machine;

first handling means working in conjunction with the worktable to turn the associated panel stack about the cutting line in a first rotation direction and in a second rotation direction opposite the first rotation direction;

a push carriage selectively movable relative to the worktable to move the associated panel stack to the cutting line;

wherein the first handling means comprise:

a first guide extending transverse to the cutting line;

a second guide extending transverse to the first guide;

a pickup element that moves selectively along the first guide, said pickup element selectively engageable and disengageable with the associated panel stack;

a push element that moves along the second guide, said push element selectively engageable and disengageable with the associated panel stack.

2. The device according to claim 1, wherein the pickup element comprises a gripper with two jaws, each jaw having a supporting portion and an active portion designed to engage the panel stack on the support portion.

3. The device according to claim 2 wherein the active portions of the jaws are mounted on the supporting portions in such a way that they can turn freely.

4. The device according to claim 2, wherein the pickup element comprises a pneumatic system that operates between the first and second jaws so as to tighten the gripper on the panel stack.

5. The device according to claim 4, wherein the pneumatic system comprises a piston attached to the second jaw and a cylinder attached to the first jaw.

6. The device according to claim 1, wherein the first guide comprises a mounting beam and a rack connected to the mounting beam.

7. The device according to claim 6, wherein the pickup element comprises a motor and a toothed wheel, the toothed wheel being meshed with the rack and being driven by the motor.

8. The device according to claim 1, comprising a bed over which the worktable is positioned, and a fence connected to the bed.

9. A device for making a series of cuts at different angles in one or more panels using a panel sawing machine that comprises:

a worktable for supporting an associated stack of one or more panels, said worktable having at least one cutting line for a panel sawing machine;

first handling means working in conjunction with the worktable to turn the associated panel stack about the cutting line in a first rotation direction and in a second rotation direction opposite the first rotation direction;

a push carriage selectively movable relative to the worktable to move the associated panel stack to the cutting line;

wherein the first handling means comprise:
  a first guide extending transverse to the cutting line;
  a second guide extending transverse to the first guide;
  a pickup element that moves selectively along the first guide, said pickup element selectively engageable and disengageable with the associated panel stack;
  a push element that moves along the second guide, said push element selectively engageable and disengageable with the associated panel stack;
  a bed over which the worktable is positioned;
  a fence connected to the bed, wherein the fence moves between an idle position under the worktable, and a working position above the worktable.

10. The device according to claim 9, wherein the fence comprises a first arm and a second arm perpendicular to the first arm, the first arm being hinged, at a first end, to the bed, and the second arm being rigidly connected to the second end of the first arm.

11. The device according to claim 9, wherein the fence comprises a lever having a first end hinged to the bed, a central portion and a second end that abuts against the first arm.

12. The device according to claim 11, comprising a control piston that operates between the bed and the central portion of the lever.

13. A device for making a series of cuts at different angles in an associated stack of one or more panels, said device comprising:
  a worktable for supporting an associated stack of one or more panels to be cut along a cutting line;
  a push carriage selectively movable relative to the worktable to move the associated stack selectively toward and away from the cutting line;
  a first guide extending transverse relative to the cutting line;
  a first pickup element movably connected to the first guide, said first pickup element selectively movable toward and away from said cutting line and selectively engageable with and disengageable from the associated stack;
  a second guide extending transverse to the first guide;
  a push element movably connected to the second guide, said push element selectively movable toward and away from said first guide and selectively engageable with and disengageable from the associated stack;
  wherein said first pickup element and said push element cooperate with each other independently of said push carriage to rotate the associated stack selectively on the worktable in first and second opposite directions.

* * * * *